United States Patent
Marchese

[11] 3,944,466
[45] Mar. 16, 1976

[54] REDUCING CONCENTRATION OF GASES IN NUCLEAR REACTOR

[75] Inventor: Robert T. Marchese, Pittsburgh, Pa.

[73] Assignee: Westinghouse Electric Corporation, Pittsburgh, Pa.

[22] Filed: July 16, 1973

[21] Appl. No.: 379,675

[52] U.S. Cl. .................. 176/37; 55/66; 423/249
[51] Int. Cl. .......................................... F42b 19/32
[58] Field of Search ............ 176/92 R, 37, 38, 19; 55/66; 423/249

[56] References Cited
UNITED STATES PATENTS

| | | | |
|---|---|---|---|
| 3,155,469 | 11/1964 | Lehmer | 176/92 R |
| 3,362,883 | 1/1968 | Wright | 176/37 |

Primary Examiner—Robert F. Stahl
Attorney, Agent, or Firm—J. R. Campbell

[57] ABSTRACT

The time taken to reduce concentration of radioactive gas in the coolant of a nuclear reactor to permissible levels during refueling or the like is reduced by injecting into the reactor coolant a quantity large compared to the quantity of fission gas, of stable gas of the same atomic number as each radioactive gas. The fission gas includes both stable and radioactive isotopes, the quantity of stable isotopes being large compared to the quantity of radioactive isotopes. The stable gas added and the fission gas of each atomic number are dissolved as one gas in the reactor fluid and are purged together, the added stable gas accelerating the dissolution of the radioactive gas.

3 Claims, 2 Drawing Figures

REDUCING CONCENTRATION OF GASES IN NUCLEAR REACTOR

BACKGROUND OF THE INVENTION

This invention relates to the nuclear-reactor art and has particular relationship to the processing of the radioactive gases which are generated as a result of the fission which takes place in a reactor. In the interest of concreteness, but not with any intention of limiting the scope of this invention, a pressurized-water (PWR) reactor is here considered. Among the important fission products of such a reactor are the radioactive isotopes xenon (Xe) 131m (metastable) 133, 133m, 135, and 135m and krypton (Kr) 85, 87, 88 and 85m (metastable). The Xe isotopes have half-lives as follows:

- 131m — 12.0 days half-life — isomeric transition to a stable isotope;
- 133 — 5.27 days half-life — isomeric transition to a stable isotope;
- 133m — 2.3 days half-life — isomeric transition to Xe 133.
- 135m — 15.3 minutes half life — isomeric transition to Xe 135 of half-life 9.2 hours.
- 135 — isomeric transition to isotope of half-life 2.6 million years.

The Kr isotopes have half-lives as follows:

- 85 — 10.6 Yrs. half-life — isomeric transition to a stable isotope;
- 85m — 4.4 hours half-life — isomeric transition to Kr85 or to stable isotope;
- 87 — 78 minutes half-life — isomeric transition to an isotope of half life $5 \times 10^{10}$ Yr;
- 88 — 2.77 hours half-life — isomeric transition to an isotope of half life 17.8 min.

Typically, the primary fluid of a PWR reactor has a volume of about 6000 to 12,000 cubic feet and while in operation may contain up to about 2.0 standard cubic ft. of the Xe fission product isotopes and 0.5 standard cubic feet of Kr fission product isotopes. This volume of fission product isotopes includes a large proportion of stable isotopes and a small proportion of radioactive isotopes. The predominant radioactive isotope present is $Xe^{133}$.

Before refueling or like operations the nuclear reactor is shut down but before the reactor becomes accessible for the actual refueling or other work the concentration of these readioactive isotopes must be reduced to a permissible level to avoid discharges of radioactive effluents into the environment of the reactor and increased doses of radioactivity to refueling personnel. While the half-life of these isotopes is relatively short, it is measured in days and hours and access to the reactor for refueling is delayed by their presence for a day or several days.

In accordance with the teachings of the prior art the primary fluid is circulated through a flash tank during normal operation of a reactor and the stripped fission gases are purged periodically or continuously. Before refueling the reactor is shut down but the circulation and purging continues. At very low fission gas concentrations required for refueling, this process is slow and inefficient. There is no provision to enhance the rate of dissolution in the flash tank other than by increasing process flow rates; this is relatively ineffective and costly.

It is an object of this invention to overcome the above-described disadvantages of the prior art and to increase the availability of a nuclear reactor for power generation by reducing substantially the time after shut down of a nuclear reactor which is consumed in waiting for the radioactivity arising from the gaseous fission products to drop to the required or established low level.

It is a further object of this invention to overcome the disadvantages of the prior art effectively and at low cost without adding additional equipment to the present nuclear-reactor plant.

SUMMARY OF THE INVENTION

In accordance with this invention an additional stable isotope of the same atomic number as each radioactive gas and of negligible radioactivity is injected into the primary fluid by the pump which circulates the primary fluid through the flash tank. Typically, the Xe isotope which is injected has a mass of 131.3 and is probably predominately composed of non-radioactive isotopes $Xe^{129}$, $Xe^{130}$, $Xe^{131}$, $Xe^{132}$, $Xe^{134}$, and $Xe^{136}$. The Kr which is injected has a mass of 83.8 and is probably predominately composed of non-radioactive isotopes $Kr^{80}$, $Kr^{82}$, $Kr^{83}$, $Kr^{84}$ and $Kr^{86}$. Both the $Xe^{131.3}$ and the $Kr^{83.8}$ have negligible radioactivity. The quantity of each of the additional stable gases which is injected is large compared to the quantity of the corresponding fission gas in the primary fluid. Typically, the volume of each stable gas is about ten times the volume of the corresponding fission gas.

The total concentration in the primary fluid of the gas of each atomic number, including the radioactive isotopes and the stable isotope, is thus increased. When the primary fluid is discharged into the flash tank, it is stripped of the dissolved gases which are removed from the tank in the hydrogen purge stream. The quantity of gas purged from the flash tank is approximately equal to the quantity injected, with the division between radioactive isotopes and stable isotopes being equal to their relative concentrations in solution. Typically, a 3600 megawatt reactor contains about 1 or 2 cubic feet of fission gases (both stable and radioactive isotopes) under standard conditions. About 10 to 20 cubic feet of stable gas, under standard conditions, is added and the rate of radioactive fission gas removal is increased substantially. The process may be initiated when the reactor is shut down under normal circumstances. If it is desirable to further shorten the shutdown period for refueling, the process can be initiated shortly before reactor shutdown.

BRIEF DESCRIPTION OF DRAWINGS

For a better understanding of this invention, both as to its organization and as to its method of operation, together with additional objects and advantages thereof, reference is made to the following description, taken in connection with the accompanying drawings, in which.

DETAILED DESCRIPTION OF INVENTION

Figure 1:
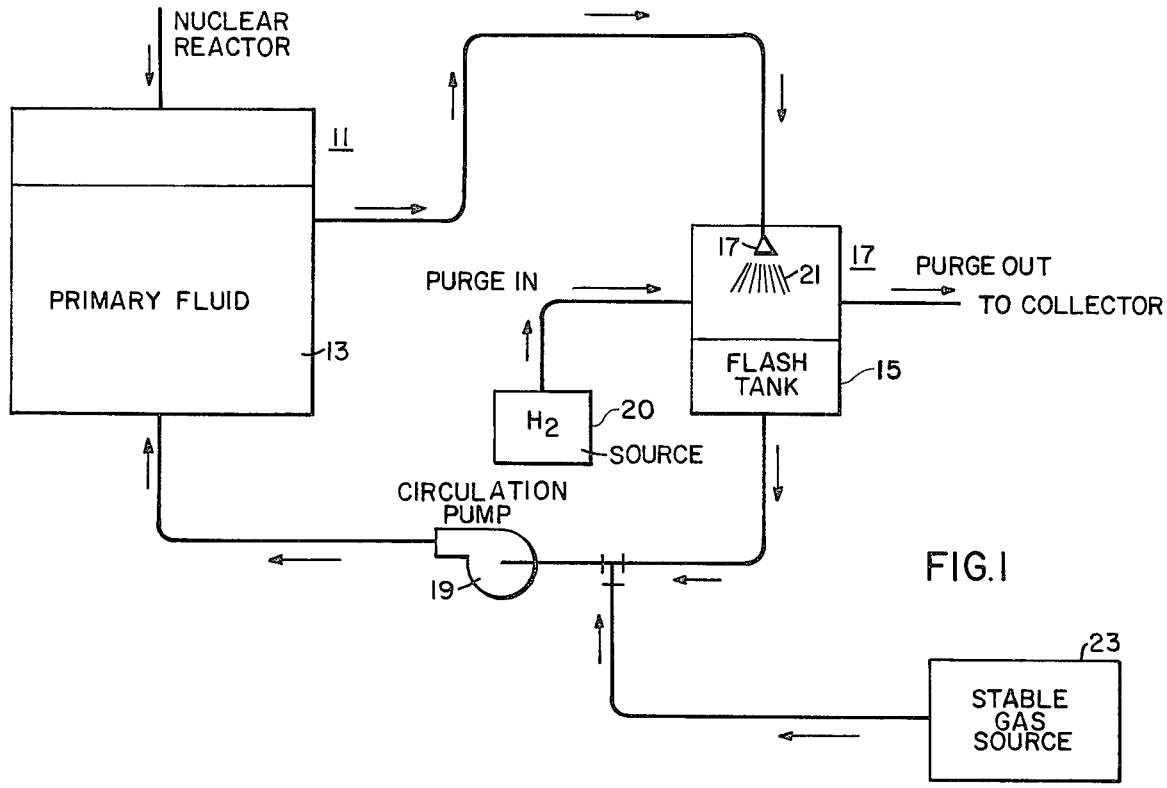
FIG. 1 is a diagrammatic view of nuclear-reactor apparatus including facilities for practicing this invention.

The apparatus shown in FIG. 1 includes a nuclear reactor 11 having a primary fluid 13 which typically is pressurized water at high temperature, about 550°F. This apparatus also includes a flash tank 15 having a spray nozzle 17, and a circulating pump 19. During normal operation of the reactor 11, the pump 19 circulates the fluid 13 through the flash tank 15. There is also a source 20 of hydrogen. During normal operation the hydrogen is passed through the spray 21 from the nozzle 17 purging the readioactive gases from the spray. The hydrogen and the purged gases pass into a biologically shielded collector where the hydrogen is burned and the gases are retained.

Figure 2:
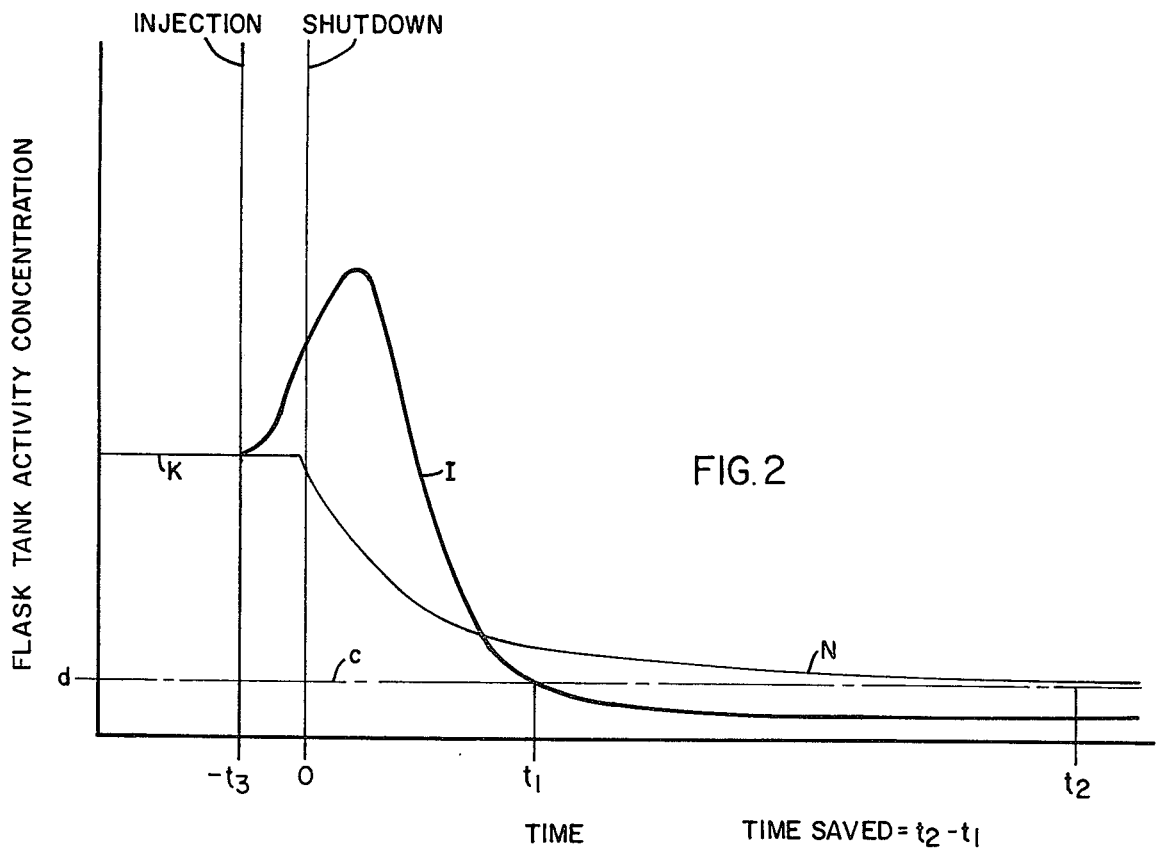
FIG. 2 is a graph illustrating the practice of this invention.

The normal operation is represented by the light-line curve in FIG. 2. In this view the radioactivity of the matter in the flash tank 15 is plotted vertically and time horizontally. During normal operation the radioactivity remains constant, as represented by the straight-line portion K of the curve, so long as the reactor is in operation. When the reactor is shut down and prior-practice is followed, the radioactivity in the flash tank 15 decreases as represented by the curved portion of the curve N. The broken line C represents radioactivity of the flash tank 15 at which access to the reactor 11 for refueling or other work is permitted. Under prior-art practice the reactor 11 is ready for refueling at time $t_2$ after shutdown.

In accordance with this invention, stable gases, from sources 23, of about 10 times the respective volume of the radioactive gases are injected into the fluid 13 by the pump 19.

The fluid injected into the spray nozzle 17 then has a concentration, in the fluid 13, of about eleven times the original concentration of fission gas. The spray containing this concentration then, under Henry's Law, tends toward an equilibrium with vapor exerting a pressure of about eleven times the pressure exerted by the fission gas alone in prior-art practice. In the practice of this invention then a substantially larger volume of gas of the same atomic number as each radioactive gas is emitted from the spray 21 and purged at the start of the injection and the remaining radioactive gas in the fluid, after shutdown, has a low concentration permitting earlier access to the reactor.

This is illustrated in FIG. 2. It is assumed that the injection of the stable gas is started at time $-t_3$ before the shutdown. The heavy curve I shows the radioactivity of the flash tank 15. The radioactivity rises rapidly to a maximum after shutdown, time 0. However, because the stable gas carries with it larger quantities of radioactive gas than in prior-art practice, The concentration of the radioactive gases in the fluid 13 is reduced more rapidly than in prior-art practice and the radioactivity reaches the magnitude c at time $t_1$ earlier than $t_2$. The reactor is accessible at a time earlier than in prior art practice equal to $t_2-t_1$ which may amount to a day or several days.

While a preferred practice of this invention has been disclosed herein, many modifications thereof are feasible. Typically, this invention could be applied to accelerating the deconcentration of tritium. The scope of this invention is not to be restricted except insofar as is necessitated by the spirit of the prior art.

I claim:

1. The method of reducing, with apparatus including a flash tank, the concentration of radioactive gas resulting from fission in a nuclear reactor having a primary liquid to render said reactor accessible, the said radioactive gas including radioactive isotopes of xenon and krypton, the the said method comprising, increasing the concentration of said isotopes in said primary liquid by pumping a quantity of stable gas of the same atomic number as xenon and krypton into said primary liquid, said last-named quantity being large compared to the quantity of said radioactive isotopes included in said primary liquid, circulating said primary liquid continuously from said reactor through said flash tank then back through said reactor, and purging the resulting mixture of said radioactive isotopes and said stable gas from said flash tank.

2. The method of claim 1 wherein the primary fluid is sprayed into said flash tank, and the stable gas is pumped into the primary liquid while the primary liquid is being circulated between the reactor and the flash tank.

3. The method of claim 1, wherein the gas resulting from fission includes radioactive isotopes of xenon and krypton and also stable isotopes of xenon and krypton, the quantity of stable isotopes being large compared to the quantity of radioactive isotopes, and the stable gas pumped into the primary liquid being additional stable gas and its quantity being large compared to the quantity of the gas resulting from fission including both said stable isotopes and said radioactive isotopes.

* * * * *